United States Patent [19]

Tacke et al.

[11] Patent Number: 5,025,065
[45] Date of Patent: Jun. 18, 1991

[54] FIRE-RETARDANT POLYCARBONATES AND POLYESTERS

[75] Inventors: Peter Tacke, Krefeld; Ulrich Grigo, Kempen; Werner Nouvertné, Krefeld; Dieter Freitag, Krefeld; Karsten-Josef Idel, Krefeld; Uwe Westeppe, Mettmann, all of Fed. Rep. of Germany

[73] Assignee: Bayer Aktiengesellschaft, Leverkusen, Fed. Rep. of Germany

[21] Appl. No.: 504,487

[22] Filed: Apr. 4, 1990

[30] Foreign Application Priority Data

Apr. 8, 1989 [DE] Fed. Rep. of Germany ....... 3911558

[51] Int. Cl.$^5$ .................. C08G 63/64; C08L 69/00
[52] U.S. Cl. ............................... 524/611; 528/176; 528/190; 528/191; 528/193; 528/194; 528/196; 528/201; 528/202; 528/204; 524/601; 524/603; 524/604
[58] Field of Search ............ 528/190, 201, 196, 204, 528/202, 191, 176, 193, 194; 524/601, 603, 604, 611

[56] References Cited

U.S. PATENT DOCUMENTS

| | | | |
|---|---|---|---|
| 3,395,119 | 7/1968 | Blaschke et al. | 260/47 |
| 4,281,099 | 7/1981 | Maresca | 528/176 |
| 4,334,053 | 6/1982 | Freitag et al. | 528/179 |
| 4,506,066 | 3/1985 | Medem et al. | 528/199 |
| 4,554,309 | 11/1985 | Mark et al. | 524/611 |

FOREIGN PATENT DOCUMENTS 1173998  9/1984  Canada .................. 217/93

Primary Examiner—John Kight, III
Assistant Examiner—Kathryne E. Shelborne
Attorney, Agent, or Firm—Joseph C. Gil; Aron Preis

[57] ABSTRACT

Fire-retardant polycarbonates, polyester carbonates and polyesters based on dihydroxydiphenyl cycloalkanes

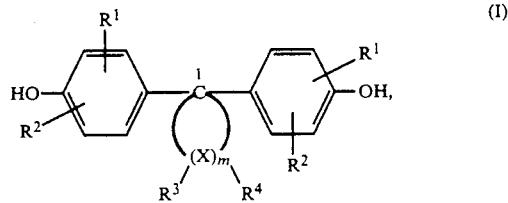

in which $R^1$ and $R^2$ independently of one another represent hydrogen, halogen, preferably chlorine or bromine, $C_1$–$C_8$ alkyl, $C_5$–$C_6$ cycloalkyl, $C_6$–$C_{10}$ aryl, preferably phenyl and $C_7$–$C_{12}$ aralkyl, preferably phenyl-$C_1$–$C_4$-alkyl, more especially benzyl, m is an integer of 4 to 7, preferably 4 or 5, $R^3$ and $R^4$ may be individually selected for each X and, independently of one another, represent hydrogen or $C_1$–$C_6$ alkyl and X is carbon, with the proviso that, at at least one atom X, $R^3$ and $R^4$ are both alkyl, the fire-retardant finish being provided by additives and/or comonomers.

7 Claims, No Drawings

FIRE-RETARDANT POLYCARBONATES AND POLYESTERS

This invention relates to fire-retardant aromatic polycarbonates, aromatic polyester carbonates and aromatic polyesters based on dihydroxydiphenyl cycloalkanes corresponding to general formula I

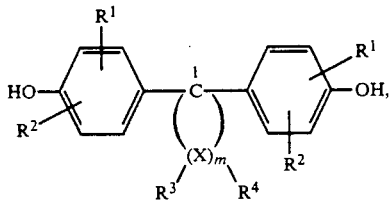

in which

R$^1$ and R$^2$ independently of one another represent hydrogen, halogen, preferably chlorine or bromine, C$_1$–C$_8$ alkyl, C$_5$–C$_6$ cycloalkyl, C$_6$–C$_{10}$ aryl, preferably phenyl and C$_7$–C$_{12}$ aralkyl, preferably phenyl-C$_1$–C$_4$-alkyl, more especially benzyl, m is an integer of 4 to 7, preferably 4 or 5, R$^3$ and R$^4$ may be individually selected for each X and, independently of one another, represent hydrogen or C$_1$–C$_6$ alkyl and X is carbon, with the proviso that, at at least one atom X, R$^3$ and R$^4$ are both alkyl.

Preferably at one to two atoms X, but more preferably at only one atom X, R$^3$ and R$^4$ are both alkyl. The preferred alkyl radical is methyl. The X atoms in the α-position to the diphenyl-substituted C atom (C-1) are preferably not dialkyl-substituted, whereas the X-atoms in the β-position to C-1 are preferably dialkyl-substituted.

The dihydroxydiphenyl cycloalkanes corresponding to formula I and their production by condensation of corresponding ketones and phenols and also corresponding polycarbonates and their production are the subject of German patent application P 38 32 396 and are described therein.

The present invention relates to the fire-retardant finishing of polymers formed from the dihydroxydiphenyl cycloalkanes corresponding to formula I. The polymers in question are the polycarbonates according to German patent application P 38 32 396, i.e. polycarbonates based completely or partly on the dihydroxydiphenyl cycloalkanes corresponding to formula I, but also purely aromatic polyesters and polyester carbonates based on these dihydroxydiphenyl cycloalkanes. The acid component in the polyesters and polyether carboxylic acids (besides carbonic acid) is an aromatic dicarboxylic acid (including hydroxycarboxylic acids) containing one or more aromatic rings.

Examples are inter alia phthalic acids, diphenyl dicarboxylic acids, diphenyl ether dicarboxylic acid, naphthalene dicarboxylic acids. Polyesters and polyester carbonates based on iso- and terephthalic acid and mixtures thereof are preferred.

Preferred polycarbonates, polyesters and polyester carbonates are those in which at least part, i.e. at least 5% by weight, of the dihydroxydiphenyl cycloalkane radicals are derived from the compound corresponding to formula II:

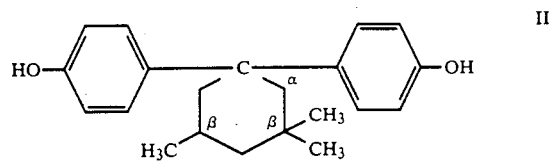

Production processes for aromatic polycarbonates, polyester carbonates and polyesters are generally known and are described, for example, in Kunststoff Handbuch, Vol. VIII, Carl Hanser Verlag, 1972 and in EP-A 36 080, DE-OS 2 24, DE-OS 1 495 302, EP-A 28 030.

The fireproofing agents used in accordance with the invention are also known. They are either added to the polycarbonates, polyesters or polyester carbonates as additives or are incorporated as comonomers in the polymer chain.

Polycarbonates, polyesters and polyester carbonates based on the dihydroxydiphenyl cycloalkanes corresponding to formula I are collectively referred to hereinafter as polymers A.

The following are suitable fire-retardant additives:

1. Alkali, alkaline earth and ammonium salts of aliphatic and aromatic sulfonic acids, carboxylic acids and phosphonic acids. They may be variously substituted, for example by F, Cl, Br, alkyl. Salt-like fire-retardant additives such as these may also be oligomeric and polymeric.

Salt-like fire-retardant additives of the type in question are described inter alia in DE-OS 1 694 640, 1 930 257, 2 049 358, 2 212 987, 2 149 311, 2 253 072, 2 703 710, 2 458 527, 2 458 968, 2 460 786, 2 460 787, 2 460 788, 2 460 935, 2 460 937, 2 460 944, 2 460 945, 2 460 946, 2 461 063, 2 461 077, 2 461 144, 2 461 145, 2 461 146, 2 643 256, 2 644 114, 2 645 415, 2 646 120, 2 647 271, 2 648 128, 2 648 131, 2 653 327, 2 744 015, 2 744 016, 2 744 017, 2 744 018, 2 745 592, 2 948 871, 2 948 439, 3 002 122.

2. Organohalogen compounds, optionally in combination with synergists, for example halogenated aromatic compounds. Compounds such as these are described inter alia in: DE-OS 2 631 756, JA 51-119059, DE-OS 3 342 636, EP-A 31 959, DE-OS 3 010 375, 2 631 756.

3. Halogenated phthalimides, phthalimide sulfonates according to DE-OS 2 703 710, 3 203 905, 3 322 057, 3 337 857, 3 023 818.

4. Salts of halogen-containing complex acids, for example cryolite, salts of tetrafluoroboric acid, fluorosilicic acid described inter alia in DE-OS 2 149 311, 3 023 818.

5. Partly or completely fluorinated polyolefins, for example those described in DE-OS 2 535 262, 2 915 563, 2 948 439, 3 023 818.

6. Sulfonamides, disulfonamides and salts thereof: EP-A 71 125, 14 322, WO 86/4911.

7. Elemental sulfur, red phosphorus: DE-OS 2 435 508, 2 355 211.

8. Ferrocene or derivatives thereof, DE-OS 2 644 437.

9. Diphenyl sulfone according to DE-OS 2 129 204.

10. Nickel salts according to DE-OS 1 918 216.

11. Polyphenylene sulfide according to DE-OS 2 503 336, EP-A 87 038.

12. Alkali and alkaline earth salts and also zinc salts of hydrochloric acid, sulfuric acid, phosphoric acid, nitric acid, hydrogen sulfide, boric acid and also acidic salts of these acids according to WO 87/542, U.S. Pat. No. 4,408,005, EP-A 174 684.

13. Siloxanes according to DE-OS 2 535 261.

The following are suitable fire-retardant comonomers:

1. Chlorinated and brominated bisphenol A and also 4,4,'-dihydroxydiphenyl sulfide (cf. EP-A 31 958, 61 060).
2. Polysiloxanes according to DE-OS 3 334 782.
3. Dihydroxydiphenyl sulfones according to U.S. Pat. No. 3,912,688.
4. Monomers producing terminal sulfoanilide groups according to EP-A 82 383.

The fire-retardant measures may be applied individually or together.

The fire-retardant additives may be incorporated in the polymers A either individually or in combination, preferably in extruders or kneaders. In many cases, the fire-retardant additives may even be added to the polymers A during their production or even to the starting materials. Solutions of the polymers A may also be added to the fire-retardant additives and the solvents subsequently evaporated. The fire-retardant additives are preferably incorporated in quantities of from 0.001 to 50% by weight, based on the polymers A, while the fire-retardant comonomers are preferably incorporated in quantities of from 0.1 to 50 mol-%.

EXAMPLES

Example A 3104 g (10 mol) of the diphenol corresponding to formula (II) and 1600 g (40 mol) NaOH are dissolved while stirring in 30 l water in an inert gas atmosphere. A solution of 18.8 g (2 mol-%) phenol in 30 l methylene chloride is then added. 1500 g (approx. 15 mol) Phosgene are then introduced into the thoroughly stirred solution at pH 13–14/21–25° C. 10 ml N-ethyl piperidine are then added, followed by stirring for 45 minutes. The bisphenolate-free aqueous phase is separated off and the organic phase after acidification with phosphoric acid is washed with water until neutral and freed from the solvent. The polycarbonate has a relative solution viscosity $\eta_{rel}$ of 1.279, as measured on a solution of 0.5 g polycarbonate in 100 ml CH$_2$Cl$_2$ solution at 23° C. (in the following Examples, $\eta_{rel}$ is determined in the same way).

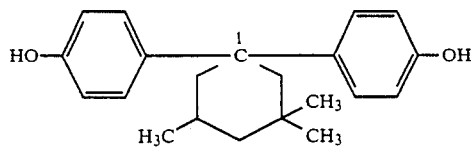

EXAMPLE B 684 g (3 mol) bisphenol A (2,2-bis-(4-hydroxyphenyl)-propane, 2170 g (7 mol) of the diphenol corresponding to formula (II) and 1600 g (40 mol) NaOH are dissolved while stirring in 30 l water in an inert gas atmosphere. A solution of 18.8 g (2 mol-%) phenol in 30 l methylene chloride is then added. 1500 g (approx. 15 mol) phosgene are then introduced into the thoroughly stirred solution at pH 13–14/21–25° C. 10 ml N-ethyl piperidine are then added followed by stirring for 45 minutes. The bisphenolate-free aqueous phase is separated off and the organic phase after acidification with phosphoric acid is washed with water until neutral and freed from the solvent. The polycarbonate has a relative solution viscosity $\eta_{rel}$ of 1.314.

Example C

A mixture of 1140 g (5 mol) bisphenol A and 1550 g (5 mol) of the diphenol corresponding to formula (II) were reacted as in Example B to form the polycarbonate which had a relative solution viscosity $\eta_{rel}$ of 1.298.

Example D

A mixture of 1596 g (7 mol) bisphenol A and 930 g (3 mol) of the diphenol corresponding to formula (II) were reacted as in Example B to form the polycarbonate which had a relative solution viscosity $\eta_{rel}$ of 1.327.

Example E 2483 g (8 mol) of the diphenol corresponding to formula (II) and 1280 g NaOH (32 mol) were dissolved while stirring under nitrogen in 30 l water, 15 g phenol (2 mol-%) chain terminator and 10 ml N-ethyl piperidine as catalyst were added to the resulting solution, followed by the introduction of 25 l methylene chloride. A solution of 812 g isophthalic acid dichloride (4 mol) and 812 g terephthalic acid dichloride (4 mol) in 5 l methylene chloride was then run in continuously over a period of 30 minutes with vigorous stirring, followed by stirring for 45 minutes during which the pH value was kept at approximately 13. The reaction mixture was worked up as described in Example A. The aromatic polyester obtained had a relative solution viscosity $\eta_{rel}$ of 1.323.

Example F

A mixture of 1240 g (4 mol) diphenol corresponding to formula (II) and 913 g (4 mol) bisphenol A was processed in the same way as in Example E. The aromatic polyester obtained had a $\eta_{rel}$ of 1.298.

Example G 3104 g (10 mol) of the diphenol corresponding to formula (II), 1600 g (40 mol) NaOH and 18.8 g (2 mol-%) phenol were dissolved while stirring under nitrogen in 30 l water, followed by the addition of 10 ml N-ethyl piperidine and 25 l methylene chloride. A solution of 507.5 g (2.5 mol) isophthalic acid dichloride and 507.5 g (2.5 mol) terephthalic acid dichloride in 5 l methylene chloride was then added with vigorous stirring over a period of 30 minutes. 750 g (7.5 mol) phosgene were then introduced over a period of 30 minutes, followed by stirring for 45 minutes. The pH value was kept at approximately 13 with NaOH. The reaction mixture was worked up in the same way as described in Example 1. The polyester carbonate had a relative solution viscosity $\eta_{rel}$ of 1.323.

Example H (5

A mixture of 1140 g (5 mol) bisphenol A and 1550 g mol) of the diphenol corresponding to formula (II) was processed as in Example G to form the polyester carbonate which had a relative solution viscosity $\eta_{rel}$ of 1.312.

Example I

In Example A, 10 mol-% of the diphenol corresponding to formula (II) was replaced by 3,3',5,5'-tetrabromobisphenol A. The polycarbonate obtained had a relative solution viscosity $\eta_{rel}$ of 1.293.

Example K

In Example A, 30 mol-% of the diphenol correspond to formula (II) was replaced by 4,4'-dihydroxydiphenyl sulfone. The polycarbonate obtained had a relative solution viscosity $\eta_{rel}$ of 1.285.

The results of the fire tests of the polymers A containing fire-retardant additives are shown in Table 1. The fire-retardant additives were incorporated in the polymers A in a Werner & Pfleiderer ZSK 32 twin-screw extruder.

The burning behavior was evaluated on the basis of the $O_2$ index in accordance with ASTM-D 2863-70. Test specimens measuring 80×6×3 mm were prepared by injection molding for these tests.

| Example | Polymer A of Example | Fire-retardant additive | Quantity % | $O_2$-index, % |
|---|---|---|---|---|
| 1* | A | — | — | 24 |
| 2* | B | — | — | 24.2 |
| 3* | C | — | — | 25.3 |
| 4* | D | — | — | 25.7 |
| 5* | E | — | — | 25.1 |
| 6* | F | — | — | 25.5 |
| 7* | G | — | — | 25.4 |
| 8* | H | — | — | 24.3 |
| 9 | I | — | — | 29.7 |
| 10 | K | — | — | 27.8 |
| 11 | A | K-p-toluenesulfonate | 0.2 | 28.6 |
| 12 | B | " | 0.2 | 28.3 |
| 13 | C | " | 0.2 | 30.1 |
| 14 | D | " | 0.2 | 32.5 |
| 15 | E | " | 0.2 | 29.4 |
| 16 | F | " | 0.2 | 29.9 |
| 17 | G | " | 0.2 | 29.6 |
| 18 | H | " | 0.2 | 28.9 |
| 19 | I | K-p-toluenesulfonate | 0.2 | 33.9 |
| 20 | K | " | 0.2 | 30.2 |
| 21 | A | Perfluoro-n-butane-K-sulfonate | " | 29 |
| 22 | E | " | " | 31 |
| 23 | A | $CF_3—CO_2—Ca—O_2C—CF_3$ | " | 29.2 |
| 24 | G | " | " | 29.5 |
| 25 | A | 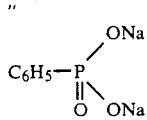 | " | 28.9 |
| 26 | F | " | " | 29.3 |
| 27 | A | 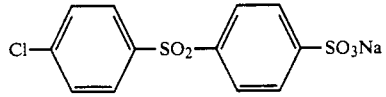 | " | 30.8 |
| 28 | C | " | " | 31.5 |
| 29 | A | Decabromodiphenyl | 5 | 29.1 |
| 30 | B | " | 5 | 29.7 |
| 31 | A | Decabromodiphenyl + $Sb_2O_3$ | 5 + 2 | 31.2 |
| 32 | C | 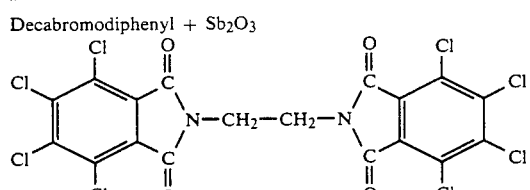 | 3 | 30.1 |
| 33 | D | | 3 | 30.5 |
| 34 | A | $Na_3AlF_6$ | 0.2 | 28.8 |
| 35 | C | " | 0.2 | 30.2 |
| 36 | C | $Na_3AlF_6$ + polytetrafluoroethylene as in Example 37 | 0.2 + 0.1 | 33.7 |
| 37 | C | Polytetrafluoroethylene, Hostaflon 1740, a product of Hoechst AG | 0.2 | 27.8 |
| 38 | A | " | 0.2 | 26.5 |
| 39 | A | 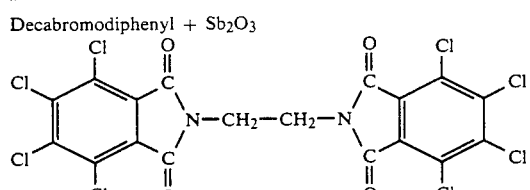 | 0.4 | 29.7 |
| 40 | F | " | 0.4 | 31.2 |
| 41 | A | Sulfur | 5 | 30.6 |
| 42 | G | " | 5 | 31.3 |
| 43 | A | Red phosphorous, average particle | 5 | 34.8 |

| Example | Polymer A of Example | Fire-retardant additive | Quantity % | O₂-index, % |
|---|---|---|---|---|
| | | diameter 35 μm | | |
| 45 | A | Ferrocene, average particle diameter 28 μm | 0.1 | 27.1 |
| 46 | E | " | 0.1 | 28.9 |
| 47 | A | Diphenylsulfone | 3 | 26.6 |
| 48 | A | Ni-Laurate | 0.02 | 29.5 |
| 49 | A | Polyphenylenesulfide according to EP-A 171021, melt viscosity 53 Pa.s at a shear rate τ of 100 Pa at 306° C. | 10 | 30.7 |
| 50 | C | | 10 | 32.2 |
| 51 | D | NaCl | 0.03 | 30.4 |
| 52 | A | K₂HPO₄ | 0.2 | 27.5 |
| 53 | A | Li₂SO₄ | 0.2 | 27.8 |
| 54 | A | NaNO₃ | 0.2 | 27.3 |
| 55 | A | ZnS | 0.5 | 28.7 |
| 56 | C | ZnS | 0.5 | 29.1 |
| 57 | A | NaHS | 0.2 | 28.3 |
| 58 | A | Na₃B₄O₇ | 0.2 | 27.9 |
| 59 | A | Polydimethylsiloxane, viscosity 170,000 mPa.s | 7 | 29.6 |
| 60 | F | | 7 | 30.4 |
| 61 | A | Polysiloxane block co-polycarbonate of Example 3 of DE-OS 33 34 782 | 50 | 29.2 |
| 62 | F | | 50 | 30.7 |
| 63 | C | K-salt of perfluoro-n-butanesulfonic acid + polytetrafluoroethylene of Example 37 | 0.2 + 0.1 | 33.4 |

Examples marked with an * are Comparison Examples

We claim:

1. A fire-retardant molding composition comprising a resin selected from the group consisting of polycarbonate, polyester carbonate and polyester, said resin being based on a dihydroxydiphenyl cycloalkane conforming to

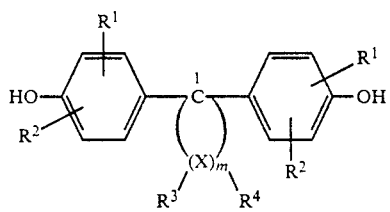

in which
R¹ and R² independently of one another represent a hydrogen or a halogen atom, $C_{1-8}$ alkyl, $C_{5-6}$ cycloalkyl, $C_{6-10}$ aryl or $C_{7-12}$ aralkyl,
m is an integer of 4 to 7,
R³ and R⁴ are individually selected for each X and independently of one another denote a hydrogen atom or a $C_{1-6}$ alkyl and,
X is carbon,
with the proviso that for at least one atom X, both R³ and R⁴ are alkyl radicals, the flame-retardant finish being provided by an additive or a comonomer.

2. Fire-retardant aromatic polycarbonates, polyester carbonates and polyesters as claimed in claim 1, characterized in that fire-retardant additives are used in quantities of from 0.001 to 50% by weight and fire-retardant comonomers in quantities of from 0.1 to 50 mol-%.

3. The composition of claim 1 wherein said dihydroxydiphenyl cycloalkane conforms to

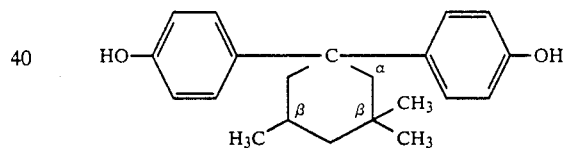

4. The composition of claim 1 wherein said halogen atom is chlorine or bromine.

5. The composition of claim 1 wherein said integer is 4 or 5.

6. The composition of claim 1 wherein said aryl is phenyl.

7. The composition of claim 1 wherein said aralkyl is phenyl-$C_{1-4}$-alkyl.

* * * * *